United States Patent
Seto (10) Patent No.: US 11,350,004 B2
(45) Date of Patent: May 31, 2022

(54) SHEET CONVEYING APPARATUS, IMAGE PROCESSING APPARATUS, AND CONVEYANCE CONTROL METHOD

(71) Applicant: KYOCERA Document Solutions Inc., Osaka (JP)

(72) Inventor: Akifumi Seto, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/189,754

(22) Filed: Mar. 2, 2021

(65) Prior Publication Data
US 2021/0281695 A1 Sep. 9, 2021

(30) Foreign Application Priority Data
Mar. 3, 2020 (JP) .............................. JP2020-035537

(51) Int. Cl.
| | | |
|---|---|---|
| *H04N 1/00* | (2006.01) | |
| *B65H 5/06* | (2006.01) | |
| *B65H 7/20* | (2006.01) | |
| *H04N 1/327* | (2006.01) | |
| *B65H 5/36* | (2006.01) | |

(52) U.S. Cl.
CPC ......... *H04N 1/00588* (2013.01); *B65H 5/062* (2013.01); *B65H 5/36* (2013.01); *B65H 7/20* (2013.01); *H04N 1/00602* (2013.01); *H04N 1/00615* (2013.01); *H04N 1/00702* (2013.01); *H04N 1/00779* (2013.01);
(Continued)

(58) Field of Classification Search
CPC ....... H04N 2201/0094; H04N 1/00408; H04N 1/0071; H04N 1/00771; H04N 1/00774; H04N 1/00809; H04N 1/00824; H04N 1/00925; H04N 2201/0082; H04N 1/00588; H04N 1/00602; H04N 1/00615; H04N 1/00702; H04N 1/00779; H04N 1/00785; H04N 1/32713; H04N 1/32765; B65H 5/062; B65H 5/36; B65H 7/20
USPC .......................................................... 358/498
See application file for complete search history.

(56) References Cited

U.S. PATENT DOCUMENTS

| | | | | |
|---|---|---|---|---|
| 9,004,336 B2* | 4/2015 | Sato | ................... | B65H 23/0322 |
| | | | | 226/19 |
| 9,656,821 B2* | 5/2017 | Kato | ..................... | B65H 7/125 |

(Continued)

FOREIGN PATENT DOCUMENTS

JP 2013-031079 2/2013

*Primary Examiner* — Negussie Worku
(74) *Attorney, Agent, or Firm* — Lex IP Meister, PLLC (57) ABSTRACT

A sheet conveying apparatus includes a pair of regulating units both of which are movable in a width direction in a document placement unit, a detection processing unit that detects a separation distance between the pair of regulating units, a restriction processing unit that restricts execution of a specific process of conveying a document when a difference between the separation distance detected at a specific timing and a reference distance exceeds a threshold value, and a cancellation processing unit that cancels the restriction on execution of the specific process when the separation distance detected after the restriction on execution of the specific process by the restriction processing unit is the same as the separation distance detected before the detection timing of the separation distance and on or after the specific timing.

10 Claims, 5 Drawing Sheets

(52) U.S. Cl.
 CPC ..... *H04N 1/00785* (2013.01); *H04N 1/32713* (2013.01); *H04N 1/32765* (2013.01); *H04N 2201/0094* (2013.01)

(56) References Cited

U.S. PATENT DOCUMENTS

| | | | | |
|---|---|---|---|---|
| 10,007,229 | B2* | 6/2018 | Mochizuki | G03G 21/1676 |
| 11,142,417 | B2* | 10/2021 | Matsumura | B65H 7/06 |
| 2016/0150099 | A1* | 5/2016 | Kawaguchi | H04N 1/00809 358/449 |
| 2018/0207948 | A1* | 7/2018 | Sheng | B41J 2/2103 |
| 2019/0100398 | A1* | 4/2019 | Nakayoshi | H04N 1/00615 |
| 2019/0233225 | A1* | 8/2019 | Ito | B65H 1/14 |
| 2021/0024318 | A1* | 1/2021 | Haruna | B65H 29/60 |
| 2021/0112171 | A1* | 4/2021 | Tachibana | B65H 7/06 |
| 2021/0144273 | A1* | 5/2021 | Nakayoshi | H04N 1/3878 |
| 2021/0243321 | A1* | 8/2021 | Yamaguchi | H04N 1/00732 |

\* cited by examiner

SHEET CONVEYING APPARATUS, IMAGE PROCESSING APPARATUS, AND CONVEYANCE CONTROL METHOD

INCORPORATION BY REFERENCE

This application is based upon and claims the benefit of priority from Japanese Patent Application No. 2020-035537, filed on Mar. 3, 2020, the entire contents of which are incorporated herein by reference.

The present disclosure relates to a sheet conveying apparatus, an image processing apparatus, and a conveyance control method.

BACKGROUND

An image processing apparatus such as a multifunction peripheral including a sheet conveying apparatus such as an automatic document feeder (ADF) is known. In this type of sheet conveying apparatus, a pair of regulating units are provided in a sheet placement unit on which a sheet to be conveyed is placed. For example, both of the pair of regulating units are movable in a width direction orthogonal to a conveyance direction of the sheet in the sheet placement unit, and regulate a position of the sheet placed on the sheet placement unit in the width direction.

In order to prevent the sheet placed on the sheet placement unit from being conveyed in an inclined posture, that may be considered in which, when a difference between a separation distance between the pair of regulating units and a size of the sheet exceeds a predetermined threshold value, execution of conveyance processing for conveying the sheet is restricted.

However, in a case where the sheet bundle is placed on the sheet placement unit, when the end portions in the width direction of the sheets included in the sheet bundle are not aligned, the difference may not be equal to or less than the threshold value even when the pair of regulating units are moved. In this case, when the execution of the conveyance process is restricted until the difference becomes equal to or less than the threshold value, the user has to manually align the sheet bundle so that the difference becomes equal to or less than the threshold value, which is troublesome.

SUMMARY

A sheet conveying apparatus according to one aspect of the present disclosure includes a conveyance unit, a pair of regulating units, a process execution unit, a detection processing unit, a restriction processing unit, and a cancellation processing unit. The conveyance unit conveys a sheet placed on a sheet placement unit. At least one of the pair of regulating units is provided to be movable in a width direction orthogonal to a conveyance direction of the sheet by the conveyance unit in the sheet placement unit, and the pair of regulating units regulate a position of the sheet in the width direction. The processing execution unit executes a specific process of conveying the sheet using the conveyance unit. The detection processing unit detects a separation distance between the pair of regulating units. The restriction processing unit restricts execution of the specific process when a difference between the separation distance detected by the detection processing unit at a predetermined specific timing and a predetermined reference distance exceeds a predetermined threshold value. The cancellation processing unit cancels the restriction on the execution of the specific process when the separation distance detected by the detection processing unit after the restriction on the execution of the specific process by the restriction processing unit is the same as the separation distance detected by the detection processing unit before a detection timing of the separation distance and on or after the specific timing.

An image processing apparatus according to another aspect of the present disclosure includes the sheet conveying apparatus.

In the image processing apparatus, the specific process is a reading process of conveying the sheet using the conveyance unit and reading image data of the sheet.

According to another aspect of the present disclosure, a conveyance control method executed by a sheet conveying apparatus including: a conveyance unit conveys a sheet placed on a sheet placement unit; and a pair of regulating units is provided to be movable in a width direction orthogonal to a conveyance direction of the sheet by the conveyance unit in the sheet placement unit, the regulating units regulating a position of the sheet in the width direction. The conveyance control method includes: executing a specific process of conveying the sheet using the conveyance unit; detecting a separation distance between the pair of regulating units; restricting execution of the specific process when a difference between the separation distance detected at a predetermined specific timing and a predetermined reference distance exceeds a predetermined threshold value; and canceling the restriction on the execution of the specific process when the separation distance detected after the restriction on the execution of the specific process is the same as the separation distance detected before the detection timing of the separation distance and on or after the specific timing.

Objects, features and advantages of the present disclosure will become more apparent from the following detailed description, in which reference is made to the accompanying drawings, in which preferred embodiments of the disclosure are shown by way of example.

DETAILED DESCRIPTION

Hereinafter, an embodiment of the present disclosure will be described with reference to the accompanying drawings. the following embodiments are examples embodying the present disclosure, and do not limit the technical scope of the present disclosure.

[Configuration of Image Processing Apparatus 10]

Figure 1:
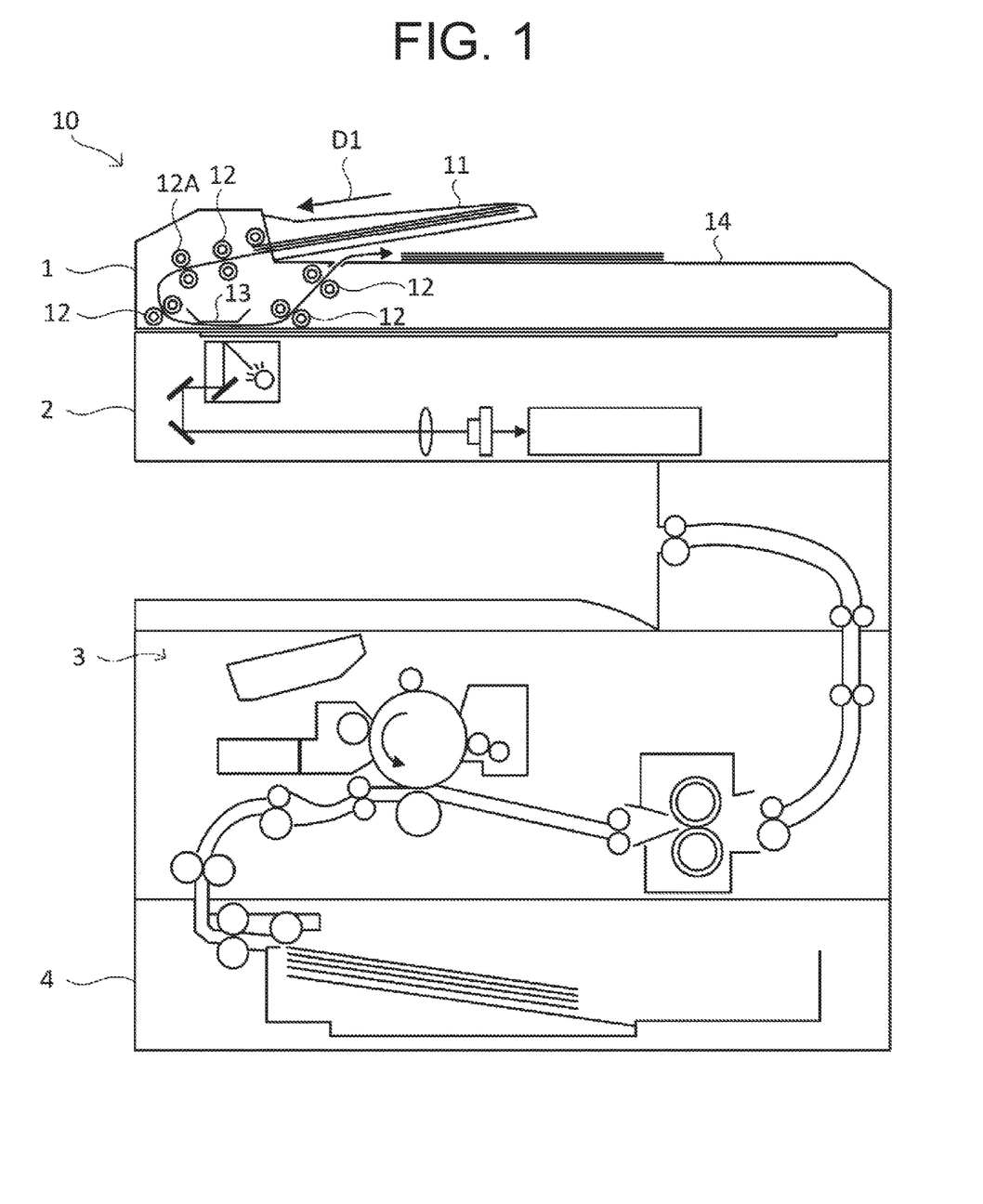
FIG. 1 is a diagram illustrating a configuration of an image processing apparatus according to an embodiment of the present disclosure.

First, a configuration of an image processing apparatus 10 according to an embodiment of the present disclosure will be described with reference to FIGS. 1 and 2. FIG. 1 is a sectional view of illustrating a configuration of the image processing apparatus 10.

The image processing apparatus 10 is a multifunction peripheral having a plurality of functions such as a scan function of reading image data from a document, a print function, a facsimile function, and a copy function. The image processing apparatus 10 may be a facsimile apparatus.

Figure 2:
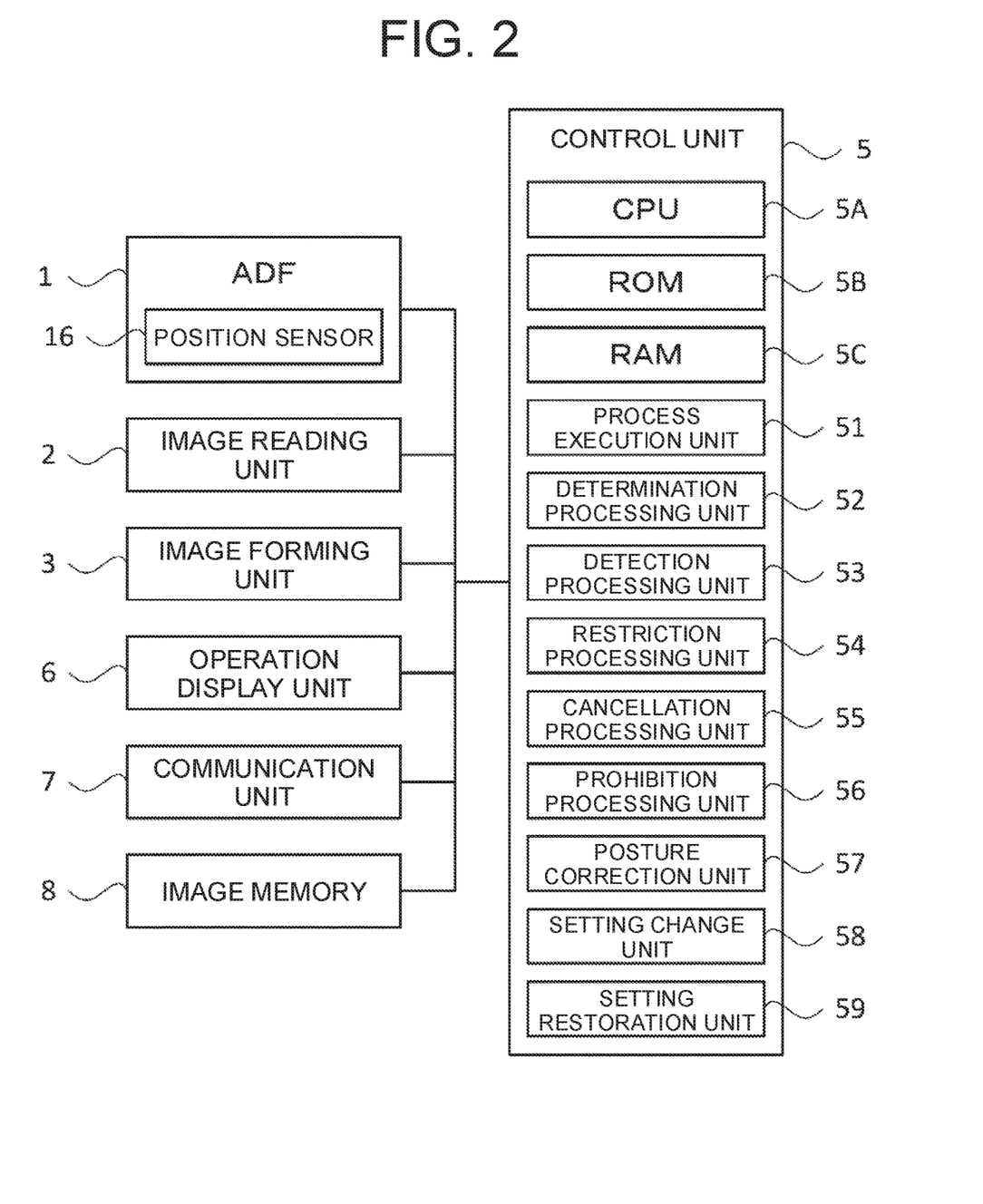
FIG. 2 is a block diagram illustrating a system configuration of the image processing apparatus according to an embodiment of the present disclosure.

As shown in FIGS. 1 and 2, the image processing apparatus 10 includes a ADF 1, an image reading unit 2, an image forming unit 3, a sheet feeding unit 4, a control unit 5, an operation display unit 6, a communication unit 7, and an image memory 8.

The ADF 1 conveys a document whose image is read by the image reading unit 2.

The image reading unit 2 reads image data from a document. As shown in FIG. 1, the image reading unit 2 includes a document table, a light source, a plurality of mirrors, an optical lens, and a CCD. The image reading unit 2 stores image data read from a document in the image memory 8.

The image forming unit 3 forms an image on a sheet by an electrophotographic method based on image data. As illustrated in FIG. 1, the image forming unit 3 includes a photosensitive drum, a charging roller, an optical scanning device, a developing device, a transfer roller, a cleaning device, a fixing device, and a sheet discharge tray. The image forming unit 3 may form an image according to another image forming method such as an inkjet method.

The sheet feeding unit 4 feeds a sheet to the image forming unit 3. As illustrated in FIG. 1, the sheet feeding unit 4 includes a sheet feeding cassette and a plurality of conveyance rollers.

The control unit 5 integrally controls the image processing apparatus 10. As illustrated in FIG. 2, the control unit 5 includes a CPU 5A, a ROM 5B, and a RAM 5C. CPU 5A is a processor that executes various types of arithmetic processing. The ROM 5B is a non-volatile storage device in which information such as a control program for causing the CPU5A to execute various processes is stored in advance. The RAM 5C is a volatile storage device used as a temporary storage memory (work area) for various processes executed by the CPU 5A. In the control unit 5, various control programs stored in advance in the ROM 5B are executed by the CPU 5A. As a result, the image processing apparatus 10 is comprehensively controlled by the control unit 5. The control unit 5 may be configured by an electronic circuit such as an integrated circuit (ASIC). The control unit 5 may be a control unit provided separately from a main control unit that comprehensively controls the image processing apparatus 10.

The operation display unit 6 is a user interface of the image processing apparatus 10. The operation display unit 6 includes a display unit such as a liquid crystal display that displays various types of information according to a control instruction from the control unit 5, and an operation unit such as an operation key or a touch panel that inputs various types of information to the control unit 5 according to a user operation.

The communication unit 7 is an interface that performs data communication with an external communication device connected via a communication network. Specifically, the communication unit 7 executes facsimile communication with an external facsimile communication apparatus connected via a telephone network. The communication unit 7 performs data communication with an external information processing apparatus connected via the Internet or a local area network (LAN).

The image memory 8 stores image data read by the image reading unit 2.

[Configuration of ADF 1]

Next, the configuration of the ADF 1 will be described with reference to FIGS. 1 to 3. Here, FIG. 3 is a plan view showing the configuration of the ADF 1.

Figure 3:
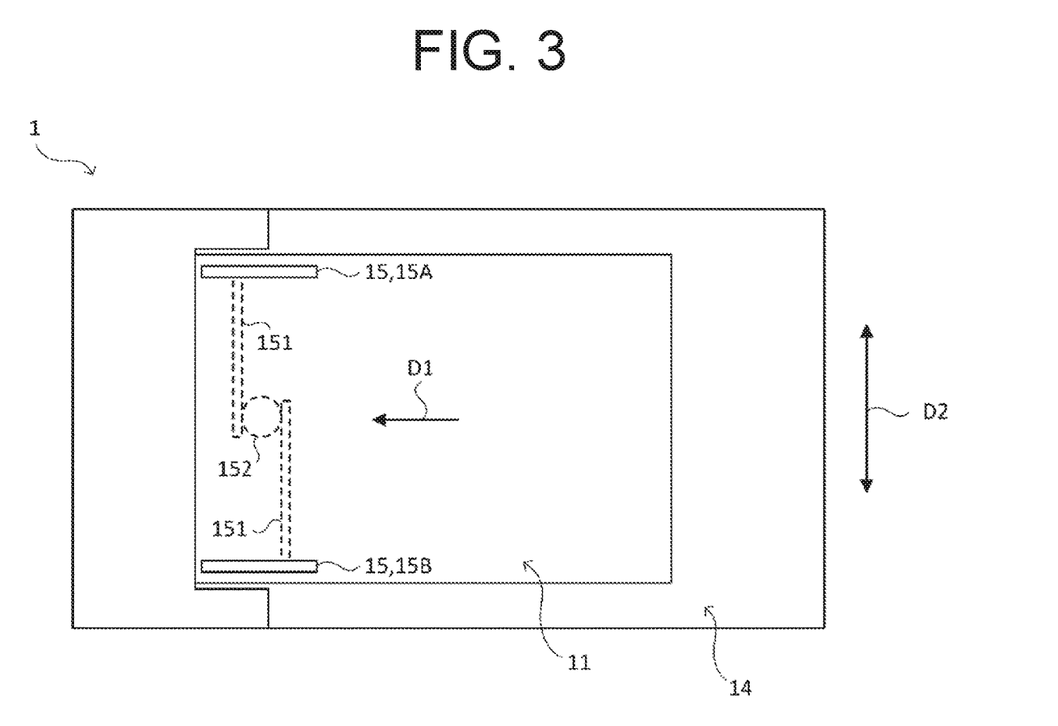
FIG. 3 is a diagram illustrating a configuration of an ADF of the image processing apparatus according to the embodiment of the present disclosure.

As illustrated in FIGS. 1 to 3, the ADF 1 includes a document placement unit 11 (an example of a sheet placement unit in the present disclosure), a plurality of conveyance roller pairs 12 (an example of a conveyance unit in the present disclosure), a document guide 13, a sheet discharge unit 14, a pair of regulating units 15, and a position sensor 16.

A document (an example of a sheet in the present disclosure) from which image data is read is placed on the document placement unit 11.

The plurality of conveyance roller pairs 12 are provided in a conveyance path of the document from the document placement unit 11 to the sheet discharge unit 14. The plurality of conveyance roller pairs 12 are provided side by side along the conveyance path. The plurality of conveyance roller pairs 12 are driven by a motor (not shown) to convey the document placed on the document placement unit 11 to the sheet discharge unit 14 via a reading position of image data by the image reading unit 2 in the conveyance path.

The document guide 13 guides the document conveyed by the plurality of conveyance roller pairs 12 to the reading position.

The document conveyed by the plurality of conveyance roller pairs 12 is discharged to the sheet discharge unit 14.

The pair of regulating units 15 regulate the position of the document in the width direction D1 (see FIG. 3) orthogonal to the conveyance direction D2 (see FIGS. 1 and 3) of the document by the plurality of conveyance roller pairs 12 in the document placement unit 11.

Specifically, the pair of regulating units 15 are provided to be spaced apart from each other in the width direction D2 in the document placement unit 11. Further, a regulating unit 15A (see FIG. 3) and a regulating unit 15B (see FIG. 3) included in the pair of regulating units 15 are each provided movably in the width direction D2.

For example, as illustrated in FIG. 3, the regulating unit 15A and the regulating unit 15B are connected to a rack 151 and a pinion 152 provided on the lower side of the document placement surface of the document placement unit 11, so that the regulating unit 15A and the regulating unit 15B are provided so as to be capable of interlocking with each other in directions approaching or separating from each other in the width direction D2.

In the document placement unit 11, only one of the regulating unit 15A and the regulating unit 15B may be provided movably in the width direction D2, and the other may be provided fixedly.

The position sensor 16 detects a separation distance between the pair of regulating units 15. For example, the position sensor 16 is an electronic circuit including a variable resistor that changes a resistance value according to the rotation of the pinion 152. The position sensor 16 outputs an electric signal including information indicating the resistance value of the variable resistor, that is, the separation distance between the pair of regulating units 15 to the control unit 5.

The position sensor 16 detects a separation distance between the pair of regulating units 15. For example, the position sensor 16 is an electronic circuit including a variable resistor that changes a resistance value according to the rotation of the pinion 152. The position sensor 16 outputs an electric signal including information indicating the resistance value of the variable resistor, that is, the separation distance between the pair of regulating units 15 to the control unit 5.

However, in a case where the document bundle is placed on the document placement unit 11, when the end portions of the respective documents included in the document bundle in the width direction D2 are not aligned, the difference may not be equal to or less than the threshold even when the pair of regulating units 15 are moved. In this case, when the execution of the reading process is limited until the difference becomes equal to or less than the threshold value, the user has to manually align the document bundle so that the difference becomes equal to or less than the threshold value.

On the contrary, in the image processing apparatus 10 according to the embodiment of the present disclosure, as described below, it is possible to suppress the document from being conveyed in the inclined posture and to reduce the labor of the user for aligning the document bundle placed on the document placement unit 11.

Specifically, an image output program for causing the ROM 5B to execute an image output process (see FIG. 4) described later is stored in advance in the CPU 5A of the control unit 5. The image output program may be recorded in a computer-readable recording medium such as a CD, a DVD, or a flash memory, read from the recording medium, and installed in a non-volatile storage device provided in the image processing apparatus 10.

The control unit 5 includes a process execution unit 51, a determination processing unit 52, a detection processing unit 53, a restriction processing unit 54, a cancellation processing unit 55, a prohibition processing unit 56, a posture correction unit 57, a setting change unit 58, and a setting restoration unit 59. Concretely, the control unit 5 executes the image output program stored in the ROM 5B by using the CPU 5A. Accordingly, the control unit 5 functions as the process execution unit 51, the determination processing unit 52, the detection processing unit 53, the restriction processing unit 54, the cancellation processing unit 55, the prohibition processing unit 56, the posture correction unit 57, the setting change unit 58, and the setting restoration unit 59. Here, an apparatus including the ADF1 and the control unit 5 is an example of a sheet conveying apparatus in the present disclosure.

The process execution unit 51 conveys the document placed on the document placement unit 11 using the plurality of conveyance roller pairs 12, and executes the reading process (an example of a specific process in the present disclosure) of reading image data of the document using the image reading unit 2.

When an output process of outputting image data read in the reading process is executed, the determination processing unit 52 determines whether or not the output process is a first facsimile transmission process (an example of a specific facsimile transmission process in the present disclosure).

Here, the first facsimile transmission process is a process of establishing connection of facsimile communication via the telephone line network with an output destination of image data before execution of the reading processing, executing the reading processing after the connection is established, and transmitting image data stored in the image memory 8 by execution of the reading processing to the output destination.

The output process includes a second facsimile transmission process and a copy process in addition to the first facsimile transmission process.

The second facsimile transmission process is a process of executing the reading process, establishing a communication connection of the facsimile communication with the output destination after the reading process is completed, and transmitting the image data stored in the image memory 8 by the reading process to the output destination.

The copy process is a process of executing the reading process and outputting image data stored in the image memory 8 by the execution of the reading process to the image forming unit 3 to print the image data.

The output process may include a scan transmission process of executing the reading process and transmitting image data stored in the image memory 8 by the execution of the reading process to an external communication device connected via the communication network different from the telephone network.

The detection processing unit 53 detects a separation distance between the pair of regulating units 15. Specifically, the detection processing unit 53 detects the separation distance between the pair of regulating units 15 using the position sensor 16.

For example, the detection processing unit 53 detects the separation distance between the pair of regulating units 15 at a predetermined specific timing. For example, the specific timing is a timing after the determination processing unit 52 determines that the output process is not the first facsimile transmission process and before the reading process is executed.

The restriction processing unit 54 restricts execution of the reading process when a difference between a separation distance between the pair of regulating units 15 detected by the detection processing unit 53 at the specific timing and a predetermined reference distance exceeds the threshold value.

For example, among a plurality of distances in the width direction D2 corresponding to a plurality of predetermined document sizes, the reference distances are distances having the smallest difference from the separation distances between the pair of regulating units 15 detected by the detection processing unit 53 at the specific timing. For example, the plurality of document sizes are B5 vertical, A4 vertical, and B4 vertical. Further, the distances of the plurality of width direction D2 corresponding to the plurality of document sizes are 182 millimeters (the lengths in the short direction of the B5 vertical size), 210 millimeters (the lengths in the short direction of the A4 vertical size), and 257 millimeters (the lengths in the short direction of the B4 vertical size).

The threshold value is a value stored in the ROM 5B in advance. The threshold value may be arbitrarily set according to a predetermined user operation on the operation display unit 6. The threshold value may be a different value for each reference distance.

When the size of the document placed on the document placement unit 11 is set by the user's operation on the operation display unit 6, the restriction processing unit 54 may acquire a distance corresponding to the set size in the width direction D2 as the reference distance.

When restricting the execution of the reading process, the restriction processing unit 54 causes the operation display unit 6 to display a guide screen including a first message indicating the restriction, a second message instructing the user to adjust the position of the document placed on the document placement unit 11 by operating the pair of regulating units 15, and a third message instructing the user to perform a predetermined detection operation after adjusting the position of the document by the pair of regulating units 15. Then, the restriction processing unit 54 receives the detection operation by the user. For example, the detection operation is a touch operation on an operation icon included in the guide screen.

Here, the detection processing unit 53 detects the separation distance between the pair of regulating units 15 in response to the detection operation after the restriction processing unit 54 restricts the execution of the reading process.

The restriction processing unit 54 does not have to receive the detection operation on the guide screen. In this case, for example, it is conceivable that the detection processing unit 53 detects the separation distance between the pair of regulating units 15 when a predetermined time has elapsed from the display timing of the guide screen.

The cancellation processing unit 55 cancels the restriction on the execution of the reading process when the separation distance between the pair of regulating units 15 detected by the detection processing unit 53 after the restriction on the execution of the reading process by the restriction processing unit 54 is the same as the separation distance between the pair of regulating units 15 detected by the detection processing unit 53 before the detection timing of the separation distance and on or after the specific timing, or when the difference between the separation distance between the pair of regulating units 15 detected by the detection processing unit 53 after the restriction on the execution of the reading process by the restriction processing unit 54 and the reference distance is equal to or less than the threshold.

For example, when the separation distance between the pair of regulating units 15 detected by the detection processing unit 53 after the restriction on the execution of the reading process by the restriction processing unit 54 is the same as the separation distance between the pair of regulating units 15 detected by the detection processing unit 53 immediately before the detection timing of the separation distance, the cancellation processing unit 55 cancels the restriction on the execution of the reading process.

The cancellation processing unit 55 may determine that the two separation distances are the same when the difference between the separation distance between the pair of regulating units 15 detected by the detection processing unit 53 after the restriction processing unit 54 restricts the execution of the reading process and the separation distance between the pair of regulating units 15 detected by the detection processing unit 53 before the detection timing of the separation distance and on or after the specific timing is equal to or less than an allowable value smaller than the threshold.

The cancellation processing unit 55 may cancel the restriction on the execution of the reading process when the separation distance between the pair of regulating units 15 detected by the detection processing unit 53 after the restriction on the execution of the reading process by the restriction processing unit 54 is the same as the separation distance between the pair of regulating units 15 detected by the detection processing unit 53 at the specific timing.

The cancellation processing unit 55 may cancel the restriction on the execution of the reading process only when the separation distance between the pair of regulating units 15 detected by the detection processing unit 53 after the restriction on the execution of the reading process by the restriction processing unit 54 is the same as the separation distance between the pair of regulating units 15 detected by the detection processing unit 53 before the detection timing of the separation distance and on or after the specific timing.

The cancellation processing unit 55 may cancel the restriction on the execution of the reading process only when the difference between the reference distance and the separation distance between the pair of regulating units 15 detected by the detection processing unit 53 after the restriction on the execution of the reading process by the restriction processing unit 54 is equal to or less than the threshold value.

When the separation distance between the pair of regulating units 15 detected by the detection processing unit 53 after the restriction processing unit 54 restricts the execution of the reading process is the same as the separation distance between the pair of regulating units 15 detected by the detection processing unit 53 before the detection timing of the separation distance and on or after the specific timing, the cancellation processing unit 55 may switch whether to cancel the restriction on the execution of the reading process according to the number of documents placed on the document placement unit 11.

Specifically, such a construction is possible in which the cancellation processing unit 55 cancels the restriction on the execution of the reading process when the number of documents placed on the document placement unit 11 exceeds a predetermined reference number, and does not cancel the restriction on the execution of the reading process when the number of documents placed on the document placement unit 11 is equal to or less than the reference number. In this case, the cancellation processing unit 55 may detect the number of documents placed on the document placement unit 11 by a method such as using a weight sensor that detects the weight of the documents placed on the document placement unit 11.

When the determination processing unit 52 determines that the output process is the first facsimile transmission process, the prohibition processing unit 56 prohibits the restriction processing unit 54 from restricting execution of the reading processing.

The control unit 5 does not have to include the determination processing unit 52 and the prohibition processing unit 56. In this case, the specific timing is a timing after an execution instruction of the output process is input and before the reading process is executed.

The posture correction unit 57 corrects the conveyance posture of the document by causing the leading end of the document to abut against a predetermined conveyance roller pair 12A (see FIG. 1) among the plurality of conveyance roller pairs 12 during the reading process. Here, as shown in FIG. 1, the specific roller pair 12A is the conveyance roller pair 12 disposed at a position different from the most upstream position in the conveyance direction D1.

More specifically, when one document is conveyed from the document placement unit 11, the posture correction unit 57 rotates the other conveyance roller pair 12 in a state where the specific roller pair 12A is stopped. As a result, the leading edge of the document conveyed from the document placement unit 11 abuts against the specific conveyance roller pair 12A, and the conveyance posture of the document is corrected. Then, after the conveyance posture of the document is corrected, the posture correction unit 57 rotates the specific conveyance roller pair 12A to convey the document downstream in the conveyance direction D2.

Here, the posture correction unit 57 corrects the conveyance posture of the document when the correction function of the conveyance posture of the document is set to be valid. For example, the control unit 5 sets the correction function of the conveyance posture of the document to be valid or invalid according to a predetermined setting operation on the operation display unit 6.

When the determination processing unit 52 determines that the output process is the first facsimile transmission process and the correction function of the conveyance posture of the document by the posture correction unit 57 is set to be invalid, the setting change unit 58 sets the correction function to be valid.

When the restriction on the execution of the reading process is set to be invalid based on the determination that the separation distance between the pair of regulating units 15 detected by the detection processing unit 53 at the second timing is equal to the separation distance between the pair of regulating units 15 detected by the detection processing unit 53 at the third timing and the correction function of the conveyance posture of the document by the posture correction unit 57 is set to be invalid, the setting change unit 58 sets the correction function to be valid.

The setting change unit 58 does not have to change the setting of the correction function when the restriction on the execution of the reading process is cancelled based on the determination that the separation distance between the pair of regulating units 15 detected by the detection processing unit 53 at the second timing is equal to the separation distance between the pair of regulating units 15 detected by the detection processing unit 53 at the third timing and when the correction function of the conveyance posture of the document by the posture correction unit 57 is set to be invalid.

When the correction function of the conveyance posture of the document is set to be valid by the setting change unit 58, the setting restoration unit 59 sets the correction function to be invalid after the end of the reading process.

The control unit 5 does not have to include the setting restoration unit 59. The control unit 5 does not have to include the posture correction unit 57, the setting change unit 58, and the setting restoration unit 59.

[Image Output Process]

Figure 4:
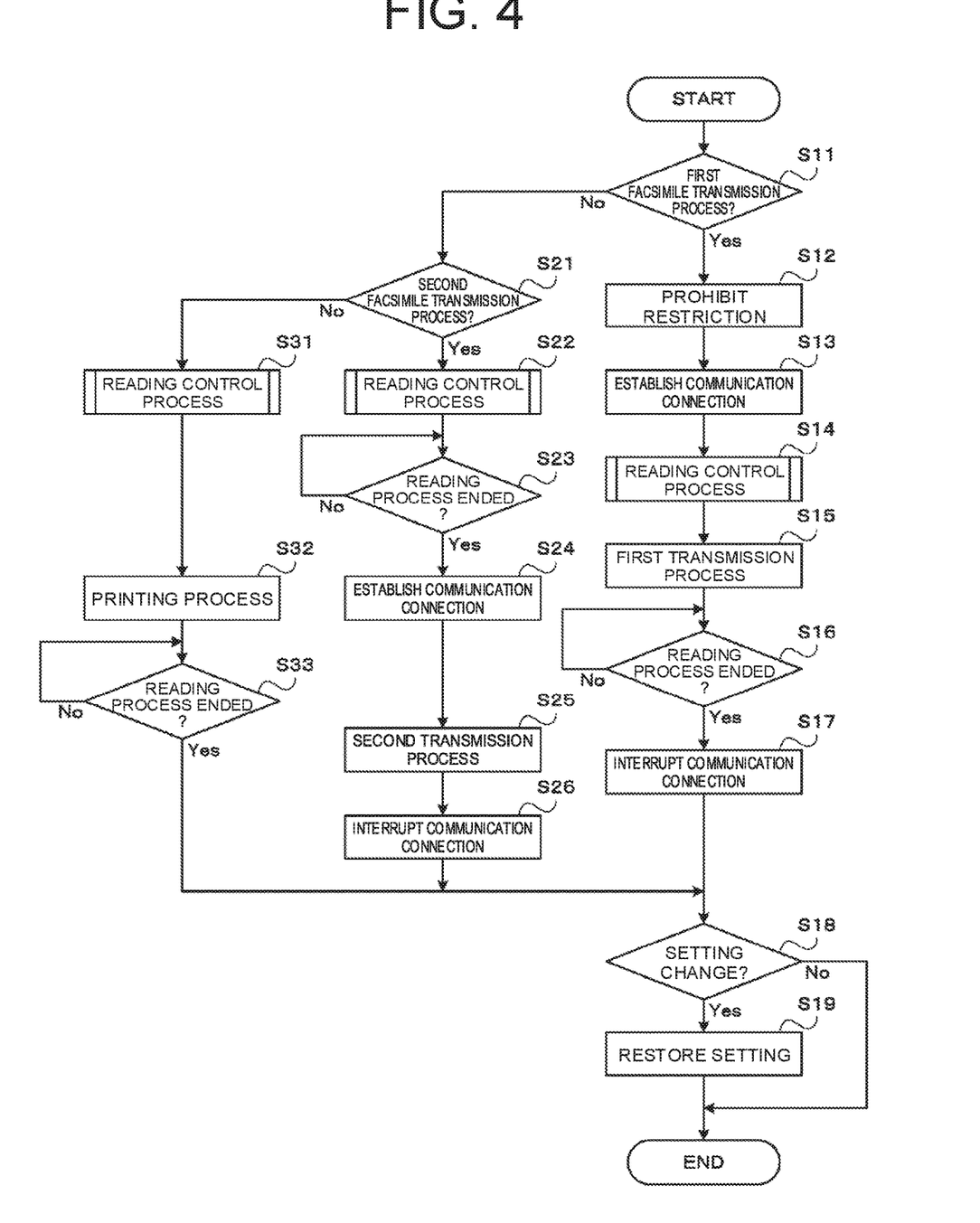
FIG. 4 is a flowchart illustrating an example of image output process executed by the image processing apparatus according to the embodiment of the present disclosure.

Hereinafter, an example of a procedure of image output process executed by the control unit 5 in the image processing apparatus 10 will be described with reference to FIG. 4. Here, steps S11, S12 represent numbers of processing procedures (steps) executed by the control unit 5. The image output process is executed when an instruction to execute the output process is input.

<Step S11>

First, in step S11, the control unit 5 determines whether or not the output process instructed to be executed is the first facsimile transmission process. Here, the process of step S11 is executed by the determination processing unit 52 of the control unit 5.

Here, when the control unit 5 determines that the output process instructed to be executed is the first facsimile transmission process (Yes in S11), the control unit 5 proceeds to step S12. If the output process instructed to be executed is not the first facsimile transmission process (No in S11), the control unit 5 proceeds to step S21.

<Step S12>

In step S12, the control unit 5 prohibits the restriction of the execution of the reading process based on the difference between the separation distance of the pair of regulating units 15 and the reference distance. Here, the process of step S12 is executed by the prohibition processing unit 56 of the control unit 5.

For example, in the image processing apparatus 10, when the image output process is executed, a prohibition flag indicating whether or not the restriction on the execution of the reading process based on the difference between the separation distance of the pair of regulating units 15 and the reference distance is prohibited is stored in a predetermined first storage area in the RAM 5C. An initial value of the prohibition flag is "0" indicating that the restriction on the execution of the reading process is not prohibited. In step S12, the control unit 5 rewrites the value of the prohibition flag to "1" indicating that the restriction of the execution of the reading process is prohibited.

<Step S13>

In step S13, the control unit 5 establishes a communication connection of the facsimile communication with the output destination.

<Step S14>

In step S14, the control unit 5 executes a reading control process described later.

<Step S21>

In step S21, the control unit 5 determines whether or not the output process instructed to be executed is the second facsimile transmission process.

Here, when the control unit 5 determines that the output process instructed to be executed is the second facsimile transmission process (Yes in S21), the control unit 5 proceeds to step S22. If the output process instructed to be executed is not the second facsimile transmission process (No in S21), the control unit 5 proceeds to step S31.

<Step S22>

In step S22, the control unit 5 executes the reading control process.

<Step S31>

In step S31, the control unit 5 executes the reading control process.

[Reading Control Process]

Figure 5:
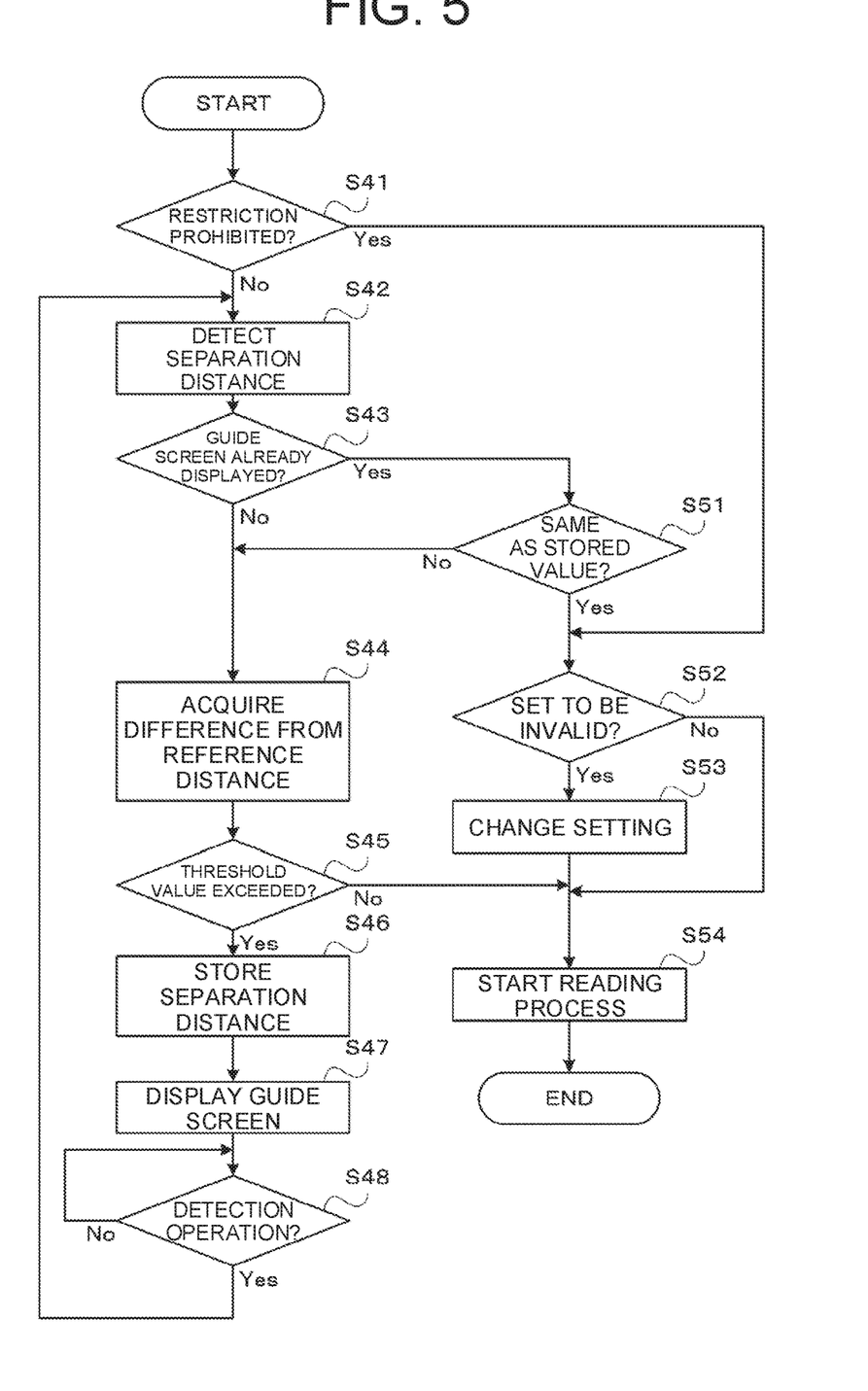
FIG. 5 is a flowchart illustrating an example of reading control processing executed by the image processing apparatus according to the embodiment of the present disclosure.

Here, the reading control process executed in the step S14, the step S22, and the step S31 of the image output process will be described with reference to FIG. 5.

<Step S41>

First, in step S41, the control unit 5 determines whether or not restriction of execution of the reading process based on the difference between the separation distance of the pair of regulating units 15 and the reference distance is prohibited.

For example, when the value of the prohibition flag is "1", the control unit 5 determines that the restriction on the execution of the reading process based on the difference between the separation distance between the pair of regulating units 15 and the reference distance is prohibited.

When the control unit 5 determines that the restriction on the execution of the reading process is prohibited (Yes in S41), the control unit 5 proceeds to step S52. This avoids execution of the processing from step S42 to step S48 for restricting execution of the reading process. If the restriction on the execution of the reading process is not prohibited (No in S41), the control unit 5 proceeds to step S42.

<Step S42>

In step S42, the control unit 5 detects the separation distance between the pair of regulating units 15. Here, the process of step S42 is executed by the detection processing unit 53 of the control unit 5.

<Step S43>

In step S43, the control unit 5 determines whether or not the guide screen has been displayed. The control unit 5 can determine whether or not the guide screen has been displayed based on whether or not the separation distances are stored in a second storage area of the RAM 5C described later.

Here, when the control unit 5 determines that the guide screen has been displayed (Yes in S43), the control unit 5 proceeds to step S51. If the guide screen has not been displayed (No in S43), the control unit 5 proceeds to step S44.

<Step S44>

In step S44, the control unit 5 acquires the difference between the separation distances detected in step S42 and the reference distance.

<Step S45>

In step S45, the control unit 5 determines whether or not the acquired value acquired in step S44 exceeds the threshold value.

Here, if the acquired value acquired in step S44 does not exceed the threshold value (No in S45), the control unit 5 proceeds to step S54. In step S54, execution of the reading process is started. That is, when the control unit 5 determines that the acquired value acquired in step S44 does not exceed the threshold value, the control unit 5 permits execution of the reading process. On the other hand, when the control unit 5 determines that the acquired value acquired in step S44 exceeds the threshold value (Yes in S45), the control unit 5 proceeds to step S46 to restrict execution of the reading process. Here, the process of step S45 is executed by the restriction processing unit 54 of the control unit 5.

<Step S46>

In step S46, the control unit 5 stores the separation distances detected in step S42 in a predetermined second storage area in RAM 5C. Specifically, the control unit 5 overwrites and stores the separation distances detected in the step S42 in the second storage area. The second storage area is, for example, a storage area that is newly secured in RAM5C when the image output process is started.

<Step S47>

In step S47, the control unit 5 displays the guide screen. Here, the process of step S47 is executed by the restriction processing unit 54 of the control unit 5.

<Step S48>

In step S48, the control unit 5 determines whether or not the detection operation has been performed on the guide screen.

The guide screen may include a fourth message indicating that the restriction on the execution of the reading process is cancelled by performing the detection operation without operating the pair of regulating units 15.

Here, when the control unit 5 determines that the detection operation is performed on the guide screen (Yes in S48), the control unit 5 proceeds to step S42. If the detection operation is not performed (No in S48), the control unit 5 waits for the detection operation to be performed in step S48.

<Step S51>

In step S51, the control unit 5 determines whether or not the separation distances detected in step S42 are the same as the separation distances stored in the second storage area.

Here, when the control unit 5 determines that the separation distances detected in step S42 and the separation distances stored in the second storage area are the same (Yes in S51), the control unit 5 proceeds to step S52. In step S54 executed after step S52, the reading process is executed. That is, when it is determined that the separation distances detected in step S42 and the separation distances stored in the second storage area are the same, the control unit 5 cancels the restriction on the execution of the reading process. On the other hand, when the separation distances detected in step S42 and the separation distances stored in the second storage area are not the same (No in S51), the control unit 5 proceeds to step S44. In this case, in the step S45 executed after the step S44, when it is determined that the acquired value acquired in the step S44 does not exceed the threshold value, the restriction on the execution of the reading process is cancelled. Here, the process of the step S51 and the processing of the second and subsequent step S45 are executed by the cancellation processing unit 55 of the control unit 5.

<Step S52>

In step S52, the control unit 5 determines whether or not the correction function of the conveyance posture of the document by the posture correction unit 57 is set to be invalid.

Here, when the control unit 5 determines that the correction function of the conveyance posture of the document by the posture correction unit 57 is set to be invalid (Yes in S52), the control unit 5 proceeds to step S53. On the other hand, when the correction function of the conveyance posture of the document by the posture correction unit 57 is not set to be invalid (No in S52), the control unit 5 proceeds to step S54.

<Step S53>

In step S53, the control unit 5 enables the correction function of the conveyance posture of the document by the posture correction unit 57. Here, the process of step S53 is executed by the setting change unit 58 of the control unit 5.

<Step S54>

In step S54, the control unit 5 starts executing the reading process. Here, the process of step S54 is executed by the process execution unit 51 of the control unit 5.

This is the end of the description of the reading control reading control process, and the description of the image output process is resumed hereafter.

<Step S15>

In step S15, the control unit 5 executes first transmission process for transmitting image data stored in the image memory 8 by the reading process started in step S54 of the reading control process, to the output destination with which the communication connection of the facsimile transmission established in step S13.

<Step S16>

In step S16, the control unit 5 determines whether or not the reading process started in step S54 of the reading control process has ended.

Here, when the control unit 5 determines that the reading process has ended (Yes in S16), the control unit 5 proceeds to step S17. If the reading process has not ended (No in S16), the control unit 5 waits for the end of the reading process in step S16.

<Step S17>

In step S17, the control unit 5 interrupts the connection of the facsimile communication with the output destination.

<Step S18>

In step S18, the control unit 5 determines whether or not the correction function of the conveyance posture of the document is set to be valid in step S53 of the reading control process.

Here, when the control unit 5 determines that the correction function of the conveyance posture of the document is set to be valid (Yes in S18), the control unit 5 proceeds to step S19. On the other hand, if the function of correcting the conveyance posture of the document is not set to be valid (No in S18), the control unit 5 ends the image output process.

<Step S19>

In step S19, the control unit 5 sets the correction function of the conveyance posture of the document to be invalid. Here, the process of step S19 is executed by the setting restoration unit 59 of the control unit 5.

<Step S23>

In step S23, the control unit 5 determines whether or not the reading process started in step S54 of the reading control process has ended.

Here, when the control unit 5 determines that the reading process has ended (Yes in S23), the control unit 5 proceeds to step S24. If the reading process has not ended (No in S23), the control unit 5 waits until the reading process is completed in step S23.

<Step S24>

In step S24, the control unit 5 establishes the connection of the facsimile communication with the output destination.

<Step S25>

In step S25, the control unit 5 executes a second transmission process of transmitting the image data stored in the image memory 8 by the reading process started in step S24 of the reading control process, to the output destination to which the connection of the facsimile communication is established in step S54.

<Step S26>

In step S26, the control unit 5 interrupts the connection of the facsimile communication with the output destination.

<Step S32>

In step S32, the control unit 5 executes a printing process for printing the image data stored in the image memory 8 by the reading process started in step S54 of the reading control process.

<Step S33>

In step S33, the control unit 5 determines whether or not the reading process started in step S54 of the reading control process has ended.

Here, when the control unit 5 determines that the reading process has ended (Yes in S33), the control unit 5 proceeds to step S18. If the reading process has not ended (No in S33), the control unit 5 waits for the end of the reading process in step S33.

As described above, in the image processing apparatus 10, when the difference between the separation distance between the pair of regulating units 15 and the reference distance exceeds the threshold value, the execution of the reading process is restricted. When the separation distance between the pair of regulating units 15 detected after the restriction of the execution of the reading process is the same as the separation distance between the pair of regulating units 15 detected before the detection timing of the separation distance and on or after the specific timing, the restriction of the execution of the reading process is cancelled. This makes it possible to provide the user with means for cancelling the restriction on the execution of the reading process without aligning the document bundle placed on the document placement unit 11. Therefore, it is possible to prevent the document from being conveyed in the inclined posture and to reduce the time and effort of the user for aligning the document bundle placed on the document placement unit 11.

Note that the sheet feeding unit 4 may include a manual feed tray on which sheets to be fed to the image forming unit 3 are placed, and a pair of regulating units at least one of which is provided to be movable in a width direction orthogonal to a sheet conveyance direction by the sheet feeding unit 4 in the manual feed tray, the regulating units regulating positions of the sheets placed on the manual feed tray in the width direction. In this case, the present disclosure may be applied to the sheet feeding unit 4. That is, the specific process may be a printing process of conveying a sheet placed on the manual feed tray by using the sheet feeding unit 4 and forming an image based on image data on the sheet.

It should be noted that the description of the one aspect of the sheet conveying apparatus according to the present disclosure, and the technical scope of the present disclosure is not limited to the above embodiment. The present disclosure may be variously changed, replaced, and modified without departing from the spirit of the technical idea, and the claims include all embodiments that can be included in the scope of the technical idea.

What is claimed is:

1. A sheet conveying apparatus comprising:
   a conveyance unit that conveys a sheet placed on a sheet placement unit;
   a pair of regulating units, at least one of which is provided to be movable in a width direction orthogonal to a conveyance direction of the sheet by the conveyance unit in the sheet placement unit, the regulating units regulating a position of the sheet in the width direction;
   a process execution unit that executes a specific process of conveying the sheet using the conveyance unit;
   a detection processing unit that detects a separation distance between the pair of regulating units;
   a restriction processing unit that restricts execution of the specific process when a difference between a first separation distance detected by the detection processing unit at a predetermined specific timing and a predetermined reference distance exceeds a predetermined threshold value; and
   a cancellation processing unit that cancels the restriction on the execution of the specific process when a second separation distance detected by the detection processing unit after the restriction on the execution of the specific process by the restriction processing unit is the same as the first separation distance detected by the detection processing unit before a detection timing of the second separation distance and on or after the predetermined specific timing.

2. The sheet conveying apparatus according to claim 1, wherein
   the detection processing unit detects the second separation distance according to a predetermined detection operation after the restriction processing unit restricts execution of the specific process.

3. An image processing apparatus comprising the sheet conveying apparatus according to claim 1, wherein
   the specific process is a reading process of reading image data of the sheet while conveying the sheet using the conveyance unit.

4. The image processing apparatus according to claim 3 comprising:
   a determination processing unit that determines, in a case where an output process of outputting the image data read in the reading process is executed, whether the output process is a specific facsimile transmission process of establishing a communication connection of facsimile communication with an output destination of the image data via a telephone line network before the execution of the reading process; and
   a prohibition processing unit that prohibits the restriction processing unit from restricting execution of the reading process when the determination processing unit determines that the output process is the specific facsimile transmission process.

5. The image processing apparatus according to claim 4, wherein
the conveyance unit includes a plurality of conveyance roller pairs arranged along the conveyance direction, and the image processing apparatus comprising:
a posture correction unit that corrects a conveyance posture of the sheet by causing a leading end of the sheet to abut against a specific roller pair disposed at a position different from a most upstream position in the conveyance direction among the plurality of conveyance roller pairs during execution of the reading process; and
a setting change unit that sets a correction function to be valid when the determination processing unit determines that the output process is the specific facsimile transmission process and the correction function of the conveyance posture by the posture correction unit is set to be invalid.

6. The image processing apparatus according to claim 5 comprising
a setting restoration unit that sets the correction function to be invalid after the end of the reading process in a case where the correction function is set to be valid by the setting change unit.

7. The image processing apparatus according to claim 3 comprising
an image forming unit that forms an image based on the image data read in the reading process.

8. The sheet conveying apparatus according to claim 1, wherein
the restriction processing unit effects display of a guide screen for receiving a detection operation by a user when restricting execution of the specific process, and
the cancellation processing unit cancels the restriction on the execution of the specific process when the second separation distance detected by the detection processing unit in accordance with the detection operation by the user is the same as the first separation distance detected by the detection processing unit.

9. A conveyance control method executed by a sheet conveying apparatus including:
a conveyance unit that conveys a sheet placed on a sheet placement unit; and
a pair of regulating units at least one of which is provided to be movable in a width direction orthogonal to a conveyance direction of the sheet by the conveyance unit in the sheet placement unit, the regulating units regulating a position of the sheet in the width direction, wherein
the conveyance control method includes following steps, wherein the conveyance control method comprising:
executing a specific process of conveying the sheet using the conveyance unit;
detecting a separation distance between the pair of regulating units;
restricting execution of the specific process when a difference between a first separation distance detected at a predetermined specific timing and a predetermined reference distance exceeds a predetermined threshold value; and
canceling the restriction on the execution of the specific process when a second separation distance detected after the restriction on the execution of the specific process is the same as the first separation distance detected before the detection timing of the second separation distance and on or after the predetermined specific timing.

10. The conveyance control method according to claim 9, wherein
the restricting includes effecting display of a guide screen for receiving a detection operation by a user when restricting execution of the specific process; and
the cancelling cancels the restriction on the execution of the specific process when the second separation distance detected in accordance with the detection operation by the user is the same as the first separation distance.

* * * * *